United States Patent [19]
Vetterli

[11] Patent Number: 5,302,407
[45] Date of Patent: Apr. 12, 1994

[54] METHOD AND APPARATUS FOR PREPARING COFFEE BEVERAGES

[75] Inventor: Heinz A. Vetterli, Siebnen, Switzerland

[73] Assignee: COSMEC S.r.l., Bergamo, Italy

[21] Appl. No.: 32,390

[22] Filed: Mar. 18, 1993

[30] Foreign Application Priority Data

Mar. 19, 1992 [DE] Fed. Rep. of Germany ....... 4208854

[51] Int. Cl.[5] .......................... A23F 5/26; A47J 31/14
[52] U.S. Cl. ..................................... 426/433; 99/287; 99/289 R; 99/302 P
[58] Field of Search ............ 99/279, 280, 287, 289 R, 99/289 T, 289 P, 295, 297, 299, 300, 302 R, 302 P; 422/433

[56] References Cited

U.S. PATENT DOCUMENTS

| | | | |
|---|---|---|---|
| 4,457,216 | 7/1984 | Dremmel | 99/287 |
| 4,796,521 | 1/1989 | Grossi | 99/287 |
| 4,797,296 | 1/1989 | Meier | 99/289 R |
| 5,230,277 | 7/1993 | Bianco | 99/287 |

*Primary Examiner*—Robert W. Jenkins
*Attorney, Agent, or Firm*—Tarolli, Sundheim & Covell

[57] ABSTRACT

The present invention provides a method for preparing coffee beverages in coffee machines wherein all of the residual water remaining between the boiler and the outlet is removed from the coffee machine between every two cycles of coffee beverage preparation. It also provides an apparatus for preparing coffee beverages comprising means for draining all of the residual water remaining between the boiler and the outlet from the coffee machine after each cycle of coffee beverage preparation. These measures secure that the residual water remaining in the apparatus after the brewing cycle is nearly completely drained from said apparatus. This guarantees that such a coffee machine prepares a beverage which meets the requirements of the user with respect to taste and temperature. Moreover, this beverage is impeccable as to its hygienic and microbiological condition.

16 Claims, 3 Drawing Sheets

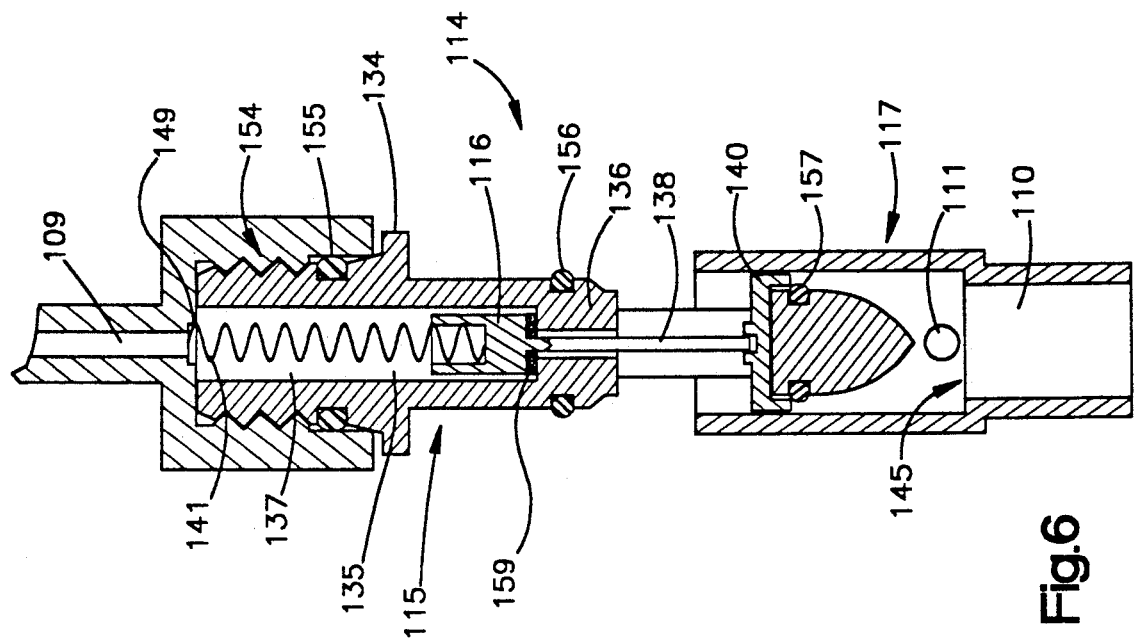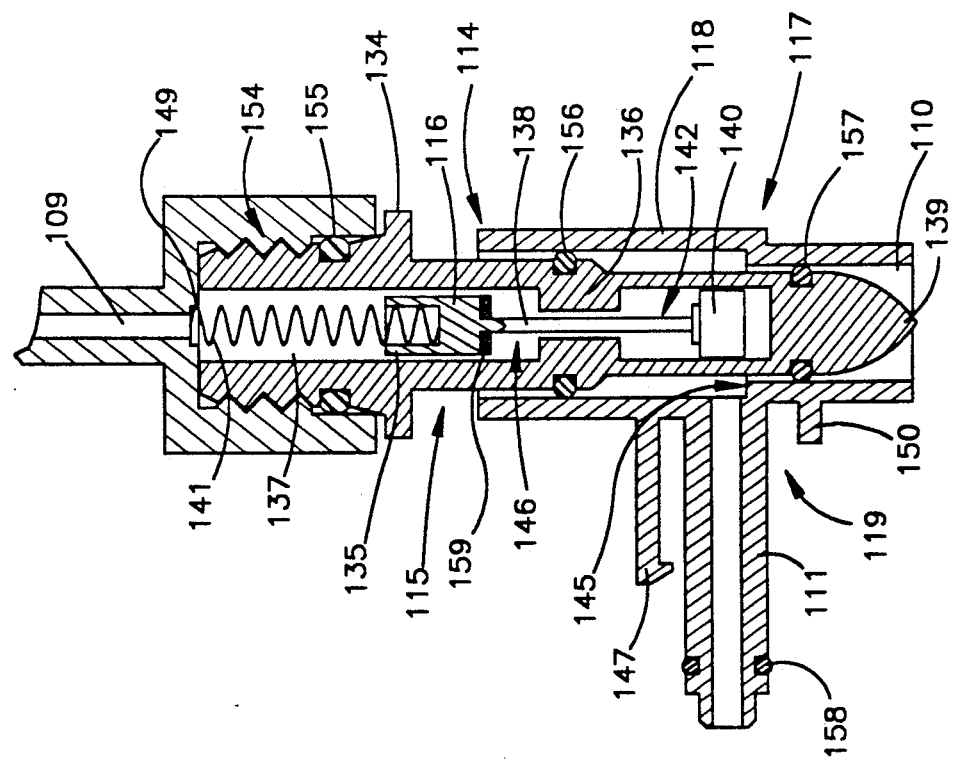

METHOD AND APPARATUS FOR PREPARING COFFEE BEVERAGES

TECHNICAL FIELD

This invention relates to a method and an apparatus for preparing coffee beverages. In particular, it relates to fully automatic coffee machines (so-called "espresso machines").

BACKGROUND OF THE INVENTION

The principle of a cycle of coffee beverage preparation is hereafter explained, by way of example, for a fully automatic coffee machine.

The quantity of coffee powder necessary for the preparation of the beverage is introduced into a brewing chamber. Then, this coffee powder is compressed to a predetermined volume by means of a movable piston, and water is taken from a fresh water container and pressurized by a pump. Then, this water is passed through a boiler and thereafter is allowed to brew the compressed coffee powder contained in said brewing chamber. Finally, the freshly prepared coffee beverage flows out from the brewing chamber and, through a suitable outlet, into a suitably placed coffee cup.

One disadvantage inherent to all known fully automatic coffee machines is that residual water remains in the coffee machine after each cycle of beverage preparation. Said residual water is the water which was drained by the water pump from the fresh water container and had gathered after said cycle of beverage preparation inside the coffee machine, generally at the lowermost points of the water conducting pipes and eventually in the brewing chamber, and which cannot flow off. The quantity of the residual water which remains in the coffee machine largely depends on the construction of the machine.

Said residual water remains in the machine until a new cycle of beverage preparation is started. Water which had gathered upstream of the boiler again passes through said boiler in the next cycle of beverage preparation. Thus, there are no objections with respect to the microbiological quality of this water. However, residual water which had gathered between the boiler and the beverage outlet is not again heated in a new cycle of beverage preparation, but mixes with the brewing water flowing through. Since the residual water eventually remains in the coffee machine for a prolonged time, there is the danger that said stale residual water is microbiologically critical.

The problems of said residual water gathered in the coffee machine exists with most of the coffee machine used today, and in particular with fully automatic coffee machines in which the brewing water flows upwardly through the coffee powder in the brewing chamber, as well as with fully automatic coffee machines which comprise a hydraulically actuated piston for compressing the coffee powder.

Apart from the objections with respect to the hygiene, said stale residual water causes further disadvantages. One of them is that the taste of the freshly brewed coffee beverage is negatively influenced by the fact that the stale residual water is mixed with the fresh water during brewing. Furthermore, said stale water, which is cold, when mixed with the just heated fresh water, reduces the temperature of the latter. If an espresso is prepared, this in particular results in a low temperature of the beverage.

With semi-automatic coffee machines, in which the coffee powder is to be dosed by the user onto a filter carrier, the problems of the residual water remaining in the coffee machine is generally solved by recommending to the user to preheat the coffee cup provided for receiving the fresh coffee beverage, before the actual cycle of beverage preparation, by starting the coffee machine without having dosed coffee powder onto the filter carrier, thus making to run only hot water through the coffee machine into the coffee cup. Obviously, in this way the remaining residual water can be removed from the coffee machine. However, this method cannot be applied to fully automatic coffee machines, since the dosing of the coffee powder is effected fully automatically, thus excluding the possibility of running only hot water into the coffee cup.

OBJECTS OF THE INVENTION

It is a primary object of the present invention is to provide a method and an apparatus such that the above-mentioned disadvantages of the prior art are avoided.

It is a further object of the invention to provide a method for preparing coffee beverages which secures the draining off of the residual water remaining between the boiler and the outlet before the actual coffee beverage is prepared.

It is a still further object of the invention to provide an apparatus for preparing coffee beverages which effects said draining without any intervention of the user, thus securing that a coffee beverage prepared by means of such coffee machine meets the requirements of the user with respect to the temperature and the taste, and further securing that no reservations have to be made with respect to the hygienic conditions of the coffee beverage.

SUMMARY OF THE INVENTION

To meet these and other objects, the present invention provides a method for preparing coffee beverages wherein all of the residual water remaining between the boiler and the outlet is removed from the coffee machine between every two cycles of coffee beverage preparation.

The invention also provides an apparatus for preparing coffee beverages comprising means for draining all of the residual water remaining between the boiler and the outlet from the coffee machine after each cycle of coffee beverage preparation.

In coffee machines of the kind described above, the parts subject to soiling are often grouped into a removable assembly, a so-called "replacement module". This means that the parts subject to soiling are to be made easily removable from the coffee machine for cleaning. However, for this purpose, a coupling is to be provided at least for the brewing water feeding pipe. Therefore, in a preferred embodiment of the present invention the valve member and the coupling member are designed to directly make with each other a coupling. By this, considerable advantages are realized, as compared with a conventional electrovalve which need a separate coupling, with respect to a simple construction of the device and thus its price, as well as to the operation of the same.

Furthermore, in said preferred embodiment of the invention no electrical contacts or plugs are required for actuating the valve assembly. Also, from the view-point of security, there is the advantage that no current-carrying conductors and contacts are present in the vicinity of water-carrying pipes. Moreover, the purely mechanical mode of working of said preferred embodiment of the valve assembly ensures a reliable function. Also, the very compact construction of the valve member and of the coupling member favors an integration into a removable assembly.

BRIEF DESCRIPTION OF THE DRAWINGS

In the following, the method according to the invention as well as an embodiment of the coffee brewing apparatus of the invention will be further described, with reference to the accompanying drawings, in which:

FIG. 5 shows a longitudinal sectional view of the valve assembly used in a coffee brewing apparatus according to the invention; and FIG. 6 shows a view similar to the one of FIG. 5, but rotated by 90 degrees.

DETAILED DESCRIPTION OF THE INVENTION

Figure 1:
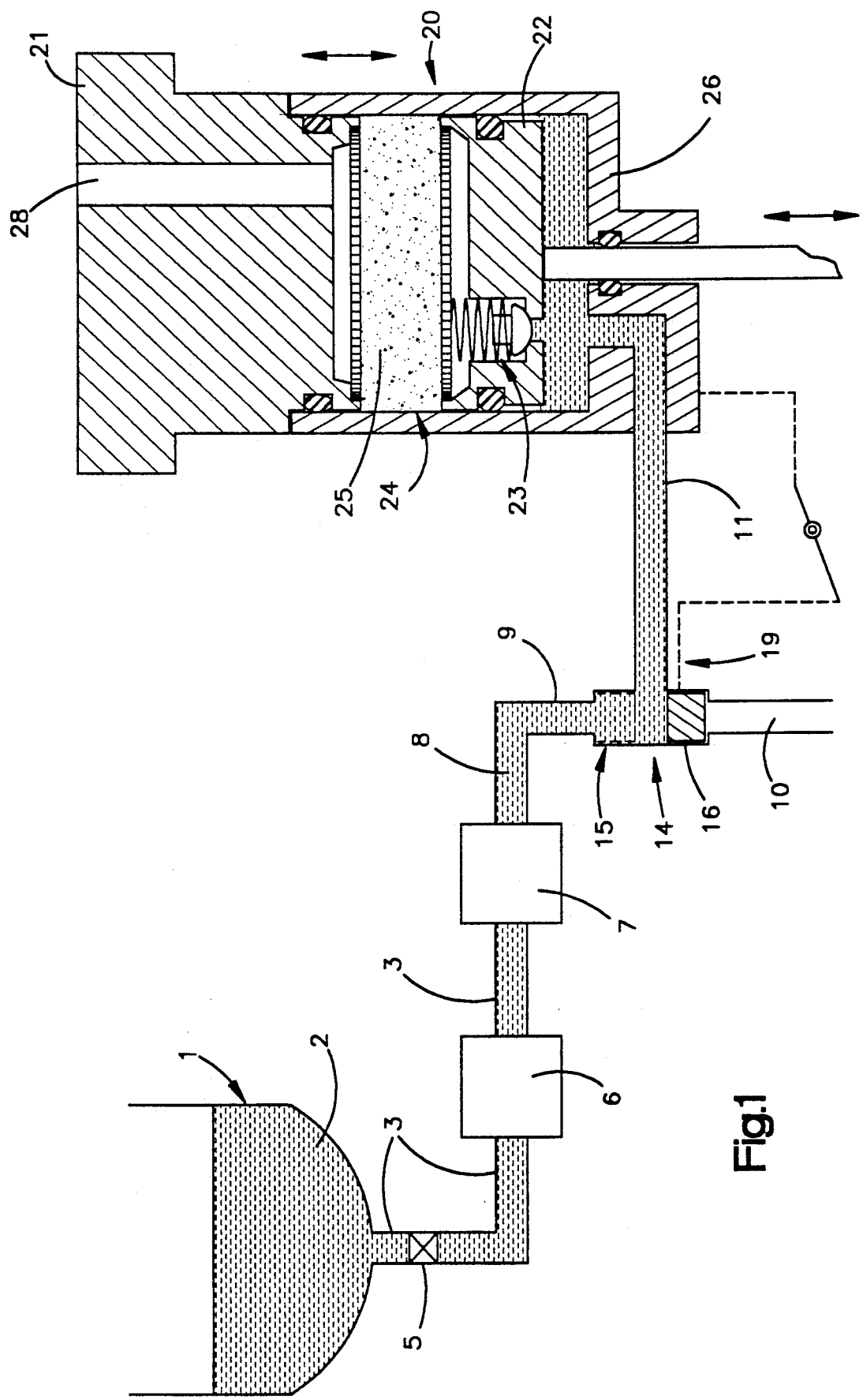
FIG. 1 shows a schematic sketch of the general layout of the relevant parts of the coffee brewing apparatus.

In FIG. 1, there is shown a schematic sketch of the general layout of the relevant parts of the coffee brewing apparatus according to the invention. As can be seen from FIG. 1, there is provided a container 1 which contains a supply of cold fresh water 2. A fresh water pipe 3 is connected to the lowermost point of the container 1. The fresh water pipe 3 leads to the inlet of a pump 6. Further, the fresh water pipe 3 is provided with a fresh water valve 5. The outlet of the pump 6 is connected to the inlet of a boiler member 7 via the fresh water pipe 3. The outlet of the boiler member 7 is connected to the inlet of a valve member 15 by means of a pipe member 9. In the interior of the valve member 15, there is provided a valve piston member 16. The valve piston member 16 is movable from a lower position (as shown in FIG. 1 of the drawings) to an upper position.

The valve member 15 is provided with a first outlet and a second outlet. Connected to the first outlet is a pipe member 10 provided for disposing residual water, as will be explained later. Connected to the second outlet is a pipe member 11 which leads to a brewing chamber, generally designated with the reference number 20. When the valve piston member is in its lower position, the pipe member 9 is connected to the pipe member 11. When the valve piston member is in its upper position (not shown in FIG. 1), the pipe member 11 is connected to the pipe member 10.

The brewing chamber 20 is movable and pivotal and is provided with a movable piston member 22 arranged in the interior of the brewing chamber 20. The pipe member 11 leads from the valve member 15 in the interior of the movable pivotal brewing chamber 20 to the back side of the movable piston member 22. The brewing chamber generally has a beaker-like shape with a cylindrical wall and, at its lower end, with a bottom portion 26. The top of the brewing chamber 20 is open. In the region of the open upper end of the brewing chamber 20, there is provided a closure piston 21 which is movable and serves for opening and closing the brewing chamber 20. The movable piston member 22 is provided with a longitudinal channel leading from the lower side of the movable piston member 22 to its upper side and being provided with a piston valve member 23 by means of which it can be closed.

The movable piston member 22 is provided with a piston rod connected to its lower back side which extends through the housing of the brewing chamber 20 to the exterior thereof. By the cooperation of the closure piston 21, the movable piston member 22 and the brewing chamber 20, a coffee brewing room 24 is defined in the interior of the brewing chamber 20. The coffee powder 25 required for brewing a coffee drink is filled into the brewing chamber 20 when the closure piston 21 is removed and is deposited in the brewing room 24.

The valve piston member 16 of the valve member 15 is, in order to be operated, mechanically coupled with the movable and pivotal brewing chamber 20, as schematically shown by a dashed line in FIG. 1. The exact operation of the valve piston member 16 in dependence with the movement of the brewing chamber 20 will be explained later.

In the following, the preparation of a coffee drink according to the method of the invention will be explained with reference to FIG. 1. The initial condition and the starting position of the elements shown in FIG. 1 is as follows:

The brewing chamber 20 has been moved towards the closure piston 21. Thereby, the closure piston 21 has engaged the open top end of the brewing chamber 20 and sealingly closes the brewing chamber 20 as well as the brewing room 24. Due to the fact that the brewing chamber 20 has been moved in upward direction, also the valve piston member 16 has been displaced into its downward position because the valve piston member 16 is mechanically coupled to the brewing chamber 20, as has been previously mentioned. Thus, the valve member 15 is in its normal operating or "pass" position; this means, there is a connection between the pipe member 9 coming from the boiler member 7 and the pipe member 11 leading to the brewing chamber 20. The mechanical coupling between the valve piston member 16 and the brewing chamber 20 is only extremely schematically shown in FIG. 1, but will be explained in detail, with reference to further figures, hereinbelow.

In a first step, fresh water 2 is fed from the container 1 through the fresh water pipe 3 into the pump 6 and pressurized. The fresh water valve 5 at the outlet of the container, thereby, is in its "pass" position. After the pump 6, the pressurized water flows through the boiler member 7 is is heated therein.

From the boiler member 7, the hot brewing water 8 flows through the pipe member 9 and the valve member 15, which is in its normal or "pass" position, into the pipe member 11 which radially merges into a lower protrusion of the brewing chamber 20. From the pipe member 11, the hot brewing water 8 is fed through a channel to a pressure chamber located on the back side of the movable piston member 22.

There, the pressurized hot brewing water 8 causes the movable piston member 22 to move upwards. Thereby, the coffee powder 25 which previously has been filled into the brewing room 24 is compressed. Since the coffee powder 25 is not compressible as much as one likes, the pressure exerted on the movable piston member 22 and on the piston valve member 23 by the pressurized hot brewing water 8 increases. As soon as a predetermined pressure is reached, the piston valve member 23 which is biased by a spring opens and releases thereby a longitudinally extending channel through the movable piston member 22 with the effect that the hot pressurized brewing water flows through this longitudinally extending channel into the brewing room 24 and, thereby, brews the coffee powder 25 contained therein. Thereafter, the freshly brewed coffee drink flows through an outlet 28 provided in the closure piston 21 out of the brewing room 24 and is led to a previously positioned cup (not shown in detail in the drawings).

As soon as the quantity of fresh water 2 required for the preparation of the coffee drink has been fed by the pump 6, the pump 6 is shut off and the fresh water valve 5 is closed. The pump 6 having been shut off, the pressure exerted by the hot brewing water 8 on the movable piston member 22 and on the piston valve member 23 decreases with the result that the piston valve member 23 closes the longitudinally extending channel provided in the movable piston member 22 under the influence of the spring. Due to the fact that the fresh water valve 5 and the piston valve member 23 have been closed, a certain quantity of water, hereinafter called "residual water", is left in the fresh water pipe 3 as well as in the brewing chamber on the back side of the movable piston member 22 which has not been used for the preparation of the coffee drink. In order to remove such undesired residual water, the valve piston member 16 of the valve member 15 is moved to its upper position by means of a linkage known per se in the prior art and, for the reason of clarity, not shown in FIG. 1. The result is that the pipe member 11 leading into the brewing chamber 20 is connected to the pipe member 10 via the valve member 15. Thereby, residual water which has been collected at the back side of the movable piston member 22 as well as in the pipe member 11 can flow out through the pipe member 10. Such removal of the residual water is supported by the movable piston member 22 which is mechanically coupled to a not shown driving means and displaced under the influence of said driving means downwardly toward the bottom portion 26 of the brewing chamber 20. Thereby, the residual water present at the back side of the movable piston member 22 is displaced and removed through pipes 11 and 10.

In the following, the mode of operation of the valve assembly 14 comprising the valve member 15 as well as the coupling member 17 will be further explained in connection with a removable brewing chamber assembly 31, with reference to FIGS. 2 to 4. In order to provide for a clearly laid out presentation in these drawings, only those parts and elements of the apparatus are shown which are important for the function to be explained hereinafter.

The brewing chamber 20, which is open at its top end, is driven to a pivotal and longitudinally reciprocating motion by means of a mechanical driving assembly 33 known per se in the prior art. The mechanical driving assembly 33 is coupled to the lower end of the brewing chamber 20 and is in a position to swivel the brewing chamber 20 to the left and to the right as well as to displace the brewing chamber 20 upwardly and downwardly. Further connected to the movable brewing chamber 20 is the coupling member 17 which incorporates the pipe member 11 leading into the brewing chamber 20. In order to close the brewing chamber 20, the closure piston 21 is located such that the upper open end of the brewing chamber 20, being in its upper final position, is sealingly closed by the closure piston 21. All these elements mentioned hereinbefore are combined in a removable brewing chamber assembly schematically indicated by the dashed lines in FIGS. 2 to 4. This removable brewing chamber assembly is connected to the coffee brewing apparatus by means of a mechanically operating coupling mechanism, known per se in the prior art and not shown in the drawings. Such a removable brewing chamber assembly is disclosed in the European Patent Specification No. 0,154,206.

The valve member 15 is connected to the hot water pipe member 9 by means of a screw thread. The hot water pipe itself, thereby, is fatened to a housing 30 enclosing the entire apparatus. Finally, it must be mentioned that the movable piston provided in the brewing chamber 20 is not shown in FIGS. 2 to 4 for clarity's sake.

Figure 2:
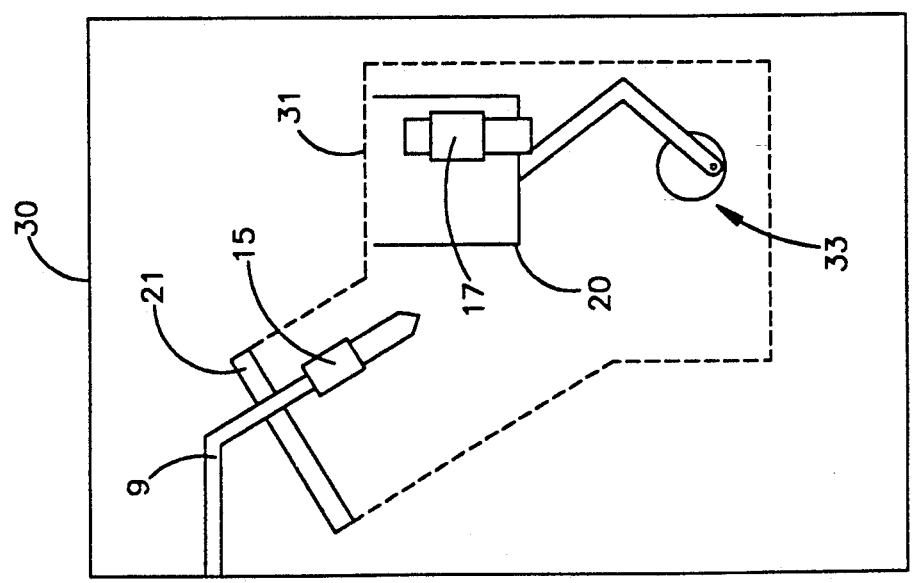

Referring now to FIG. 2, it can be seen that the movable brewing chamber 20 is in its initial position. For this purpose, the brewing chamber 20 has been displaced in its lower right position. In this position, the valve member 15 fixed to the pipe member 9 is removed from the coupling member 17 with the result that no brewing water 8 can get into the brewing chamber 20 via the valve member 15 and the coupling member 17. Furthermore, in this position, the entire removable brewing chamber assembly 31 can be removed from the housing 30 in a backward direction with reference to the drawing plane. By the way, this position corresponds to the operating step "removal of the residual water" in which the water contained in the room backwards of the movable piston member 22 and in the pipe member 11 can flow away.

Figure 3:
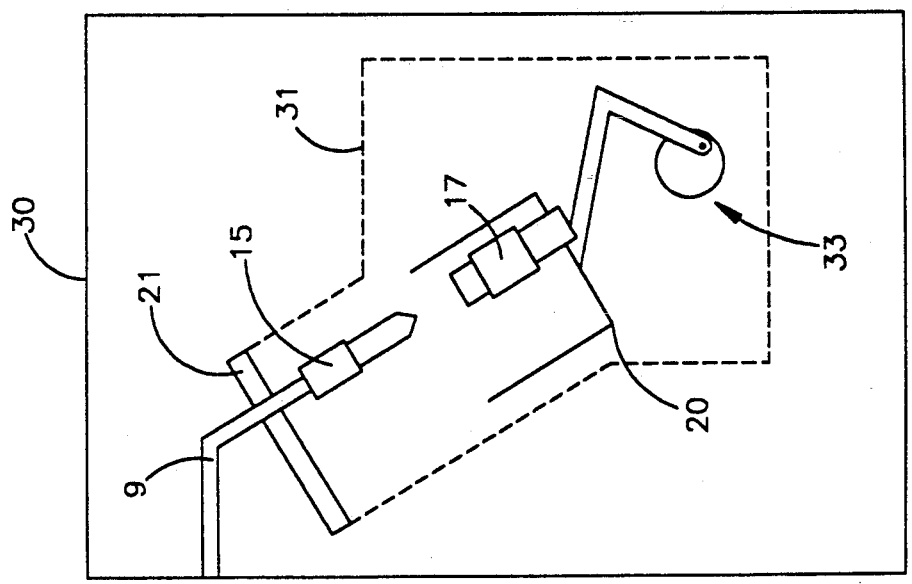

In FIG. 3, the movable brewing chamber 20 is shown in an intermediate position. Thereby, the movable brewing chamber 20 has been swiveled to the left under the influence of the mechanical driving assembly 33. It can be seen that, in this position of the brewing chamber, there is no connection between the valve member 15 and the coupling member 17.

Figure 4:
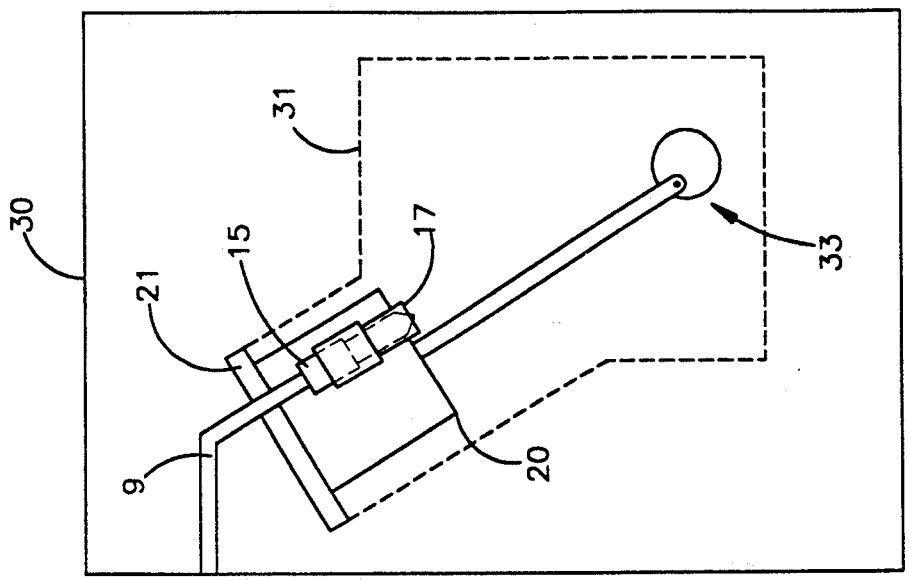
FIGS. 2 to 4 show schematic sketches for the illustration of the general function of a valve assembly used in a coffee brewing apparatus according to the invention in connection with a movable, pivotable brewing chamber in three different phases of operation.

In FIG. 4, the movable brewing chamber 20 is shown in its operating position, i.e. the brewing position. For this purpose, the movable brewing chamber 20 has been linearly displaced upwardly towards the closure piston 21 with the effect that the top of the brewing chamber now is sealingly closed by the closure piston 21. It is understood that the coupling member 17 which is connected to the brewing chamber 20 has been upwardly displaced as well during this displacement of the brewing chamber 20 in an oblique upward direction. Due to the relative displacement between the stationary valve member 15 and the movable coupling member 17, the valve member 15 has been driven into the coupling member 17. The result is that a connection is established between the pipe member 9 and the pipe member 11 which leads into the brewing chamber 20. Thus, hot brewing water 8 can be fed into the brewing chamber 20 via the valve member 15 and the coupling member 17, which together form a coupling assembly, and can brew the coffee powder 25 contained in the brewing room 24.

A practical embodiment of the valve assembly 14 is shown in detail in FIGS. 5 and 6 and is designated, in these figures, by reference numeral 114. As can be seen in FIG. 5, the valve assembly 114 essentially comprises an oblong valve member 115 and a coupling member 117 designed as a branched pipe section. The valve member 115 comprises a valve body member 136 with a valve piston member 116 as well as an actuating shackle 140 and a spring 141.

The upper end of the valve body member 136 is provided with an outer screw thread 154. In the region of the lower end of this outer screw thread 154, a groove is provided in which a sealing ring member 151 is inserted which surrounds the valve body member 136. Below the sealing ring member 155, there is provided a first conical portion merging into a radially protruding portion 134 having a hexagonal circumferential shape. Following this radially protruding portion 134, there is provided a first cylindrical portion which comprises, in the region of its lower end, a further groove being provided with a sealing ring member 156 surrounding the valve body member 136.

Further following the outer contour of the valve body member 136, the latter one further comprises thereafter a second conical portion as well as a second cylindrical portion, said second cylindrical portion having a smaller diameter than said first cylindrical portion. Said second cylindrical portion of the valve body member 136 comprises a crosswise extending channel 142 having rectangular cross section. At the lower end of said second cylindrical portion, there is provided a further groove receiving a sealing ring member 157 surrounding the valve body member 136. The lowermost portion 139 of the valve body member 136 has a conically tapered shape.

In the interior of the valve body member 136, from its top, there is provided a central bore 137 which leads at its lower end into the aforementioned rectangularly cross-sectioned channel 142. The central bore 137 comprises a first upper portion having a larger diameter and a second lower portion having a smaller diameter. The transition from the portion with the larger diameter to the portion with the smaller diameter is located in the region of the aforementioned sealing ring member 156. Due to this transition from the portion with the larger diameter to the portion with the smaller diameter, a shoulder is formed. The channel 142 with rectangular cross section is designed such that it can receive an U-shaped actuating shackle 140 and, simultaneously, serves as a guide for this shackle in vertical direction.

At the back side of the aforementioned actuating shackle 140, there is provided a blind bore 135. In its rest position, the central portion of the actuating shackle 140 rests on the bottom of the rectangular channel 142, while the two shanks of the actuating shackle 140, which protrude rectangularly downward, overlap the valve body member 136 outside of the channel 142. The valve piston member 116 guided in the interior of the central bore 137 comprises a connecting rod 138 fixed to its lower end. This connecting rod 138 corresponds, as far as its horizontal position is concerned, with the position of the blind bore 135 provided at the upper end of the actuating shackle 140. The connecting rod 138 extends in its vertical length into the aforementioned blind bore 135. Thus, the valve piston 166 can be actuated by the actuating shackle 140 via the connecting rod 138. In order to enable the cylindric central bore 137 to be sealed by means of the valve piston member 116 at the position where the aforementioned larger diameter portion merges into the smaller diameter portion, the valve piston member 116 is provided at its lower end with an annular sealing member 159. The upper end portion of the valve piston member 166 is provided with a central blind bore 135.

The valve body member 136 and, thereby, the valve member 115 is screwed by means of the outer screw thred 154 into a corresponding screw thread provided in the pipe member 109. Thus, a connection is established between the pipe member 109 and the central bore 137 provided in the valve body member 136. At its end near the valve member 115, the pipe member 109 comprises an annular recess 149 which has a somewhat greater diameter than the inner diameter of the pipe member 109. Between the annular recess 149 and the blind bore 135 of the movable valve piston member 116, a spring 141 is inserted. The spring 141 is biased. Thereby, the movable valve piston member 116 is pressed downwards against the aforementioned shoulder under the influence of the spring 141 such that the annular sealing member 159 is pressed against this shoulder and, consequently, the room above the shoulder is sealed against the room below the shoulder. Due to its specific gravity as well as due to the biasing force of the spring 141, the actuating shackle 140 is pressed downwards as well with the result that the central portion of the actuating shackle 140 abuts against the bottom of the rectangularly shaped channel 142. This situation corresponds to the rest position of the valve member 115.

The coupling member 117 comprises a main tube-shaped portion 118 and a radially merging branch pipe portion 119 having a smaller diameter than the main tube-shaped portion 118. The bore running vertically through the main tube-shaped portion 118 comprises two different diameters. As the bore has a cylindrical shape, a shoulder portion 145 is formed between the transition from the upper bigger diameter to the lower smaller diameter. In order to connect the main tube-shaped portion 118 to the brewing chamber 20, there is provided a resilient snap hook 147 located above the branch pipe portion 119, extending radially from the main tube-shaped portion 118 and running parallely to the branch pipe portion 119. The main tube-shaped portion 118 of the coupling member 117 is provided with a guiding member 150 mounted below the branch pipe portion 119 and radially extending from the main tube-shaped portion 118. It serves for the guiding upon the connection of the coupling member 117 to the brewing chamber 20 to provide for the correct positioning of the coupling member 117. At the end of the branch pipe portion 119, there is provided a sealing ring member 158.

In FIG. 5, the valve member 115 can be seen in a position in which the hot brewing water 8 is led via the pipe member 109 and the valve member 115 into the branch pipe portion 119 and, thereby, into the brewing chamber 20.

For this purpose, the valve member 115 has penetrated, with its lower end, the tube-shaped portion 118 to such an extent until the lower end of the valve member 115 is approximately flushing with the lower edge of the tube-shaped portion 118. The penetration of the valve member 115 into the tube-shaped portion 118 is facilitated by the conically tapered shape of the valve piston member 116 at its lowermost portion 139. Due to the fact that the valve member 115 has penetrated the the tube-shaped portion 118, the actuating shackle 140 abuts against the shoulder portion 145 of the tube-shabped portion 118 of the valve member 115. Thereby, the valve piston member 116 which is biased by the spring 141 is pushed upwardly by means of the connecting rod 138. The result is that a gap 146 is created between the annular sealing member 159 of the valve piston member 116 an the shoulder in the blind bore 135 of the valve body member. Now, the hot brewing water 8 can flow via the pipe member 109 and the central bore 137 of the valve member 115 into the branch pipe section and, from there, via the pipe member 111 into the brewing chamber, i.e. into the room at the back of the movable piston member 22. The path of the brewing water 8 from the back of the movable piston member 22 into the brewing room 24 has been described in connection with FIG. 1.

As already mentioned, the sealing ring member 157 of the valve member 115 is in contact with the wall of the pipe member 110. Due to this fact, it is ensured that no brewing water 8 can get into the pipe member 110 during this phase of operation. In order to ensure that the pressurized brewing water 8 cannot escape upwardly out of the branched tube-shaped portion 118, the annual sealing ring member 158 of the valve member 115 is in contact with the upper wall of the tube-shaped portion 118. The uppermost sealing ring member 155 of the valve member 115 at the end of the outer screw thread 154 seals the pipe member 109 against the valve body member 136 at its outside.

FIG. 6 shows the valve assembly 114 in that position where the residual water can flow off. For this purpose, the valve member was moved upward to a position where the middle sealing ring member 156 is moved to some extent out of the tube-shaped portion 118. By this, the sealing ring member 157 no longer seals the pipe member 110, thereby creating connections between the branch pipe portion 119 and the pipe member 110, and therefore between the pipe member 111 and the pipe member 110. This is necessary in order to allow the water which was displaced by moving back the piston member 22 to flow off via the pipe member 11 into the draining pipe 110.

After the moving back of the valve member 115, the actuating shackle 140 no longer lies on the shoulder portion 145 of the tube-shaped portion 118, so that the valve piston member 116 and the actuating shackle 140 are pushed downward. Now, the annular sealing member 159 of the valve piston member 116 lies on the shoulder portion 145 of the central bore 137, and thus seals the central bore 137. This means that in this position no brewing water 8 can enter the brewing chamber 20 via the valve member 115 of the valve assembly 114. The fact that the valve piston member 116 is provided with a blind bore 135 on its back, favors the sealing of the central bore 137 by the sealing ring member 159 at the shoulder portion of this central bore 137, since in the case of an unvoluntary admission of brewing water 8 the valve piston member 116 is pushed downward in addition to the spring 141.

The mechanical actuation of the valve piston member 116 via the actuating shackle 140 is effected for these two embodiments via the shoulder portion 145 of the coupling member 117 attached to the brewing chamber 20, and thus compulsoryly coupled with the former, in the same manner as described above.

The measures described hereinbefore secure that the residual water remaining in the apparatus after the brewing cycle is nearly completely drained from said apparatus. This quarantees that such a coffee machine prepares a beverage which meets the requirements of the user with respect to taste and temperature. Moreover, this beverage is impeccable as to its hygienic and microbiological condition.

What is claimed is:

1. A method for the preparation of coffee beverages in a coffee machine, said method comprising the following steps:
   heating brewing water in a boiler member;
   compressing coffee powder contained in a brewing chamber;
   percolating the compressed coffee powder contained in the brewing chamber by said heated brewing water for brewing a coffee beverage in a brewing step;
   passing the brewed coffee beverage to an outlet;
   withdrawing said brewed coffee beverage from said outlet;
   draining all of the residual water contained in said apparatus between said boiler member and said outlet before to starting the next cycle of beverage preparation.

2. The method of claim 1, wherein:
   during said brewing step a brewing water feeding pipe member is connected to a pipe member leading to said brewing chamber, and simultaneously a pipe member provided for draining said residual water is locked; and
   after said brewing step said brewing water feeding pipe member is locked and said pipe member leading to said brewing chamber is connected to a draining pipe member in order to drain said residual water.

3. The method of claim 2, wherein the connecting and locking of said pipe members is effected by mechanical means, the control of said mechanical means being effected by actuating means provided for actuating said brewing chamber or its closure piston.

4. An apparatus for the preparation of coffee beverages comprising:
   a boiler member for heating fresh water;
   a brewing chamber for containing coffee powder;
   means for compressing said coffee powder contained in said brewing chamber;
   an outlet for the brewed coffee beverage;
   means for draining all of the residual water remaining in said apparatus between said boiler member and said outlet after the brewing step.

5. The apparatus of claim 4, wherein said means for draining all of the residual water remaining in said apparatus between said boiler member and said outlet after the brewing step comprise a valve assembly which comprises a breewing water feeding pipe member, a connection to said breewing chamber, and a residual water outlet.

6. The apparatus of claim 5, wherein said valve assembly comprises:
   a stationary valve member connected to said brewing water feeding pipe member; and
   a movable coupling member which is connectable to said brewing chamber feeding pipe member and to said residual water outlet.

7. The apparatus of claim 6, wherein said movable coupling member is a pipe section comprising a branch.

8. The apparatus of claim 7, wherein said branch of said pipe section is designed as a brewing chamber connecting pipe which is pluggable to and detachable from said brewing chamber.

9. The apparatus of claim 8, wherein said brewing chamber connecting pipe of said pipe section is a common part of a pipe member which enables both the admission of said brewing water to said brewing chamber and said draining of said residual water.

10. The apparatus of claim 6, wherein said pipe section has two different inside diameters, the transition section between said two diameters forming a shoulder portion.

11. The apparatus of claim 6 wherein said valve member comprises a front part corresponding to said coupling member with respect to their forms in order to allow coupling and detaching said two members.

12. The apparatus of claim 6, wherein said valve member comprises:
 a central bore containing a valve piston member which is designed as a locking member for said bore and is mechanically actuated; and
 a spring destined for keeping said valve piston member in its lower position in which said valve piston member locks said central bore.

13. The apparatus of claim 12 wherein said valve piston member comprises a blind bore which is admitted by the pressurized brewing water, thereby additionally endevoring to keep said valve piston member in its lower position.

14. The apparatus of claim 12, wherein said valve piston member of said valve member is mechanically actuated by said coupling member, said coupling member being actuated by actuating means provided for actuating said brewing chamber or its closure piston.

15. The apparatus of claim 12 further comprising an actuating shackle for moving said valve piston member, said actuating shackle being actuable by said coupling member at a shoulder portion of the latter.

16. The apparatus of claim 5, wherein the parts subject to soiling are grouped into a removable assembly comprising a brewing water feeding pipe member which can be coupled to and uncoupled from said brewing beverage feeding pipe member.

* * * * *